(12) United States Patent
Panchapakesan et al.

(10) Patent No.: US 11,158,342 B2
(45) Date of Patent: Oct. 26, 2021

(54) SYSTEMS FOR OPTIMIZED PRESENTATION CAPTURE

(71) Applicant: AIRWATCH LLC, Atlanta, GA (US)

(72) Inventors: Ramani Panchapakesan, Bangalore (IN); Neelima Bojja, Bangalore (IN); Suhas S Kulkarni, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 171 days.

(21) Appl. No.: 15/050,489

(22) Filed: Feb. 23, 2016

(65) Prior Publication Data

US 2017/0133058 A1 May 11, 2017

(30) Foreign Application Priority Data

Nov. 6, 2015 (IN) .......................... 6008/CHE/2015

(51) Int. Cl.
| | | |
|---|---|---|
| *G11B 20/00* | (2006.01) | |
| *G11B 27/00* | (2006.01) | |
| *G11B 20/10* | (2006.01) | |
| *H04N 9/87* | (2006.01) | |
| *G11B 27/10* | (2006.01) | |
| *G06F 40/169* | (2020.01) | |

(52) U.S. Cl.
CPC ...... *G11B 20/10527* (2013.01); *G06F 40/169* (2020.01); *G11B 27/105* (2013.01); *H04N 9/8715* (2013.01)

(58) Field of Classification Search
CPC ........ G06F 17/24; G06F 17/25; G06F 17/241; A63F 2300/5553; A63F 2300/6623; G06T 11/60; H04N 5/9305; G11B 20/10527; G11B 27/10

USPC ................................ 715/201, 202, 230, 255
See application file for complete search history.

(56) References Cited

U.S. PATENT DOCUMENTS

| | | | | |
|---|---|---|---|---|
| 6,084,582 A | * | 7/2000 | Qureshi | H04N 1/32112 715/243 |
| 7,954,049 B2 | * | 5/2011 | Fletcher | G06F 40/169 715/231 |
| 2009/0055745 A1 | * | 2/2009 | Christiansen | H04N 9/8205 715/723 |
| 2011/0249954 A1 | * | 10/2011 | Meek | H04N 5/772 386/239 |
| 2015/0086172 A1 | * | 3/2015 | Pajouh | G11B 27/11 386/201 |
| 2015/0312637 A1 | * | 10/2015 | Maisenbacher | H04N 21/812 725/32 |
| 2018/0293243 A1 | * | 10/2018 | Weber | G06F 16/4393 |

\* cited by examiner

*Primary Examiner* — Kavita Stanley
*Assistant Examiner* — Jenq-Kang Chu
(74) *Attorney, Agent, or Firm* — Clayton, McKay & Bailey, PC (57) ABSTRACT

Systems herein allow a user to record a presentation with a slides file. The system can record action events generated by a viewer application that displays slides of the slides file. The system can also record an audio segment for each displayed slide. An action information file can be created that links action events and audio segments to slides, and provides timing information for the action events. This can allow for playback of a narrated presentation where actions are recreated in synchronization with the narration while reducing the reliance on large video files.

18 Claims, 7 Drawing Sheets

```
<AWPresentation>                                    ⌒302
    <slides>  ⌒304
        <slide number="1">  ⌒306
            <audioFile name="audio101.mp3"/>  ⌒308
            <startTime>00:00:00</startTime>  ⌒310
            <action>  ⌒312
                <type>Flip Forward</type>  ⌒314
                <time>00:05:07</time>  ⌒316
            </action>
            <endTime>00:05:07</endTime>  ⌒318
        </slide>
        <slide number="102">  ⌒320
            <audioFile name="audio2.mp3"/>  ⌒322
            <startTime>00:05:07</startTime>  ⌒324
            <action>  ⌒326
                <PinchIn percent="10" steps="20"/>  ⌒328
                <time>00:06:08</time>  ⌒330
            </action>
            <action>
                <circle x="50",y="40",stroke="blue",stroke-width="2"/>  ⌒332
                <time>00:07:21</time>  ⌒334
            </action>
            <action>
                <flipForward/>  ⌒336
                <time>00:08:02</time>  ⌒338
            </action>
            <endTime>00:08:02</endTime>  ⌒340
        </slide>
        ...
    </slides>
<AWPresentation>
```

SYSTEMS FOR OPTIMIZED PRESENTATION CAPTURE

RELATED APPLICATIONS

Benefit is claimed under 35 U.S.C. 119(a)-(d) to Foreign application Serial No. 6008/CHE/2015 filed in India entitled "SYSTEMS FOR OPTIMIZED PRESENTATION CAPTURE", on Nov. 6, 2015, by AIRWATCH LLC, which is herein incorporated in its entirety by reference for all purposes.

BACKGROUND

Most types of training and education can incorporate slide presentations given by a presenter. Such presentations often include a slide show with narration. The presentations can be given to a live audience, and are also often recorded for use outside of a live context. For example, a corporate presentation consisting of a slide show and a live presenter can be video recorded for consumption by employees that cannot attend live. Similarly, a training program can be recorded and distributed for future consumption at a time convenient to a user. With current technology, recording a presentation involves recording video of a presentation screen along with audio of the presenter. This results in a video recording having an audio narration that accompanies slide changes and any annotations made to the slides by the presenter during the presentation.

However, the technology for recording and distributing such presentations has several shortcomings. The first is a storage and bandwidth problem. Because presentations can be lengthy (e.g., hours or days), the corresponding video files can be quite large. In a corporate environment where training videos are stored and disseminated for employee usage, storage and network bandwidth can be negatively impacted. Additionally, when a video presentation is edited or updated, network bandwidth and storage problems can become exacerbated. A new large video file can need to be replicated across the network to other users, consuming valuable network bandwidth. Where each version of a video presentation is stored, this process can also negatively impact storage capacity.

Additionally, during playback, locating desired content within a large video file can be cumbersome. Employees can waste valuable work time attempting to locate a presenter's discussion on a subset of the slides covered during the entire presentation. Unless the video is manually annotated with appropriate bookmarks, which is also inefficient to do, it is difficult for a user to locate the relevant discussion within the video file. Further, it can be difficult for an employee to know which version of a video presentation corresponds to a slide deck that they have accessed on the enterprise network without watching portions of several videos.

Current technologies also make editing a recorded presentation difficult. If new slides are added or existing slides are modified, some or all of the video must be rerecorded. This can cause the presenter to take additional time away from their actual job to rerecord the entire presentation. The presenter can manually splice together updated video, but this can require reviewing of the original video to make sure the right portions are updated. Because the process is not easy, employees might put off making needed presentation updates.

Based on at least these problems specific to presentation recording technology, a need exists for systems for optimized presentation capture.

SUMMARY

An example presentation capture system can include a management component that executes on a user device. The management component can allow the user device to execute a viewer application for viewing a slides file while recording action events generated by the viewer application and slide-specific media segments. The slides file can be any type of electronic file with pages, such as a PPT document, PDF, word processor document, or spreadsheet. A media segment can be audio or video. The action events and media segments can be stored on a management server in association with the slides file. This can allow the viewer application to later playback a presentation by opening a slides file, playing media segments, and performing actions in timed synchronization.

To capture a presentation, the management component can record audio and capture action events, such as graphical user interface (GUI) events that are generated by the viewer application. The action events can relate to a user navigating through a presentation or a computer, annotating, selecting, and zooming. The action events are not, in one example, provided by a user intending to directly control audio capture, such as by selecting record. Actions can be captured automatically by a management component. The management component can execute as part of a content application in one example. When a slide is presented in the viewer application, the management component can reset a slide timer and begin recording an audio segment. When a GUI event is detected, action metadata indicating the type of GU event and the timing of the GUI event can be recorded. Example GUI events include zooming, annotating, drawing, typing, and navigating to another slide. When the GUI event indicates the user is leaving a slide (e.g., next slide or slides file closing), the audio segment can end and can be stored.

Additionally, the management component can determine that the viewer application is minimized by detecting a background event. In response, the management component can turn on video capture while the slide show is minimized, and record a video segment. This can limit video segments to presentation portions that occur outside of the slide show, in an example.

This can result in a series of recorded audio segments and recorded action metadata for multiple slides in the slides file, and video segments for presentation portions that occur outside the slide show.

The management component can create an action information file. An action information file is a file that associates action metadata, such as GUI events, and media segments with particular slides. An exemplary action information file is shown in FIG. 3, as described below. The action information file can specify the slides file for use with the action metadata and media segments. For each slide that is part of the presentation, the action information file can specify a recorded audio segment and any action metadata recorded during the duration of the audio segment. The action metadata can allow the viewer application to re-create the same actions and annotations that the presenter made to the slides during capture.

For non-slide segments, the action information file can specify a video segment to play. This can replicate presentation portions that occurred outside the viewer application while minimizing the amount of video information recorded, for storage and bandwidth purposes.

To playback a presentation, the user can select a slides file in the content application. The content application can request and receive from the management server an action information file and corresponding media segments along with the slides file. The viewer application can open the slides file, allowing the user to navigate to any slide they wish to view. The user can turn on playback in the viewer application. When the user opens a slide, the viewer application or management component can begin playing a corresponding media file. The management component can begin incrementing a timer, and execute GUI events based on the time associated with the events in the action information file. In this way, the user can experience the recorded presentation while being able to efficiently skip to slides of interest and while also reducing or eliminating reliance on large video files.

To edit a captured presentation, a user (e.g., presenter) can add or modify one or more slides, creating a new version of the slides file. Using the viewer application, the user can record audio and the system can automatically capture action metadata for the new or modified slides. The management component can create a new action information file that contains the new action events and identifies new audio segments for the new or modified slides. Then, the content application can upload the new audio segments and action information file to the management server. The management server can track versions of both the slides file and the action information file. This can allow the management server to distribute the new audio segments to a user device without redundantly distributing audio segments that are already on the user device.

It is to be understood that both the foregoing general description and the following detailed description are exemplary and explanatory only and are not restrictive of the examples, as claimed.

BRIEF DESCRIPTION OF THE DRAWINGS

FIG. 3 is an exemplary illustration of an action information file.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for optimized presentation capture. Unlike current presentation capture technologies, a system herein can minimize file sizes and bandwidth associated with recording and distributing a presentation. Instead of recording a large continuous video file, the system can capture audio segments for each slide, along with action metadata for annotations performed on the respective slide by a presenter.

When a user device records a presentation for a slides file, a management component can cause a different audio segment to be recorded each time the user changes slides. The management component can also record GUI events generated by the viewer application while each slide is in view. The system can create an action information file that identifies, for each recorded slide, an audio clip and any action event that occurred during recording of that slide. The action information file can allow a user to playback the presentation by opening the slides file in the viewer application. For a particular slide, the viewer application or management component can play the captured audio file and replicate the GUI events that represent presenter annotations or manipulations of a slide.

Figure 1:
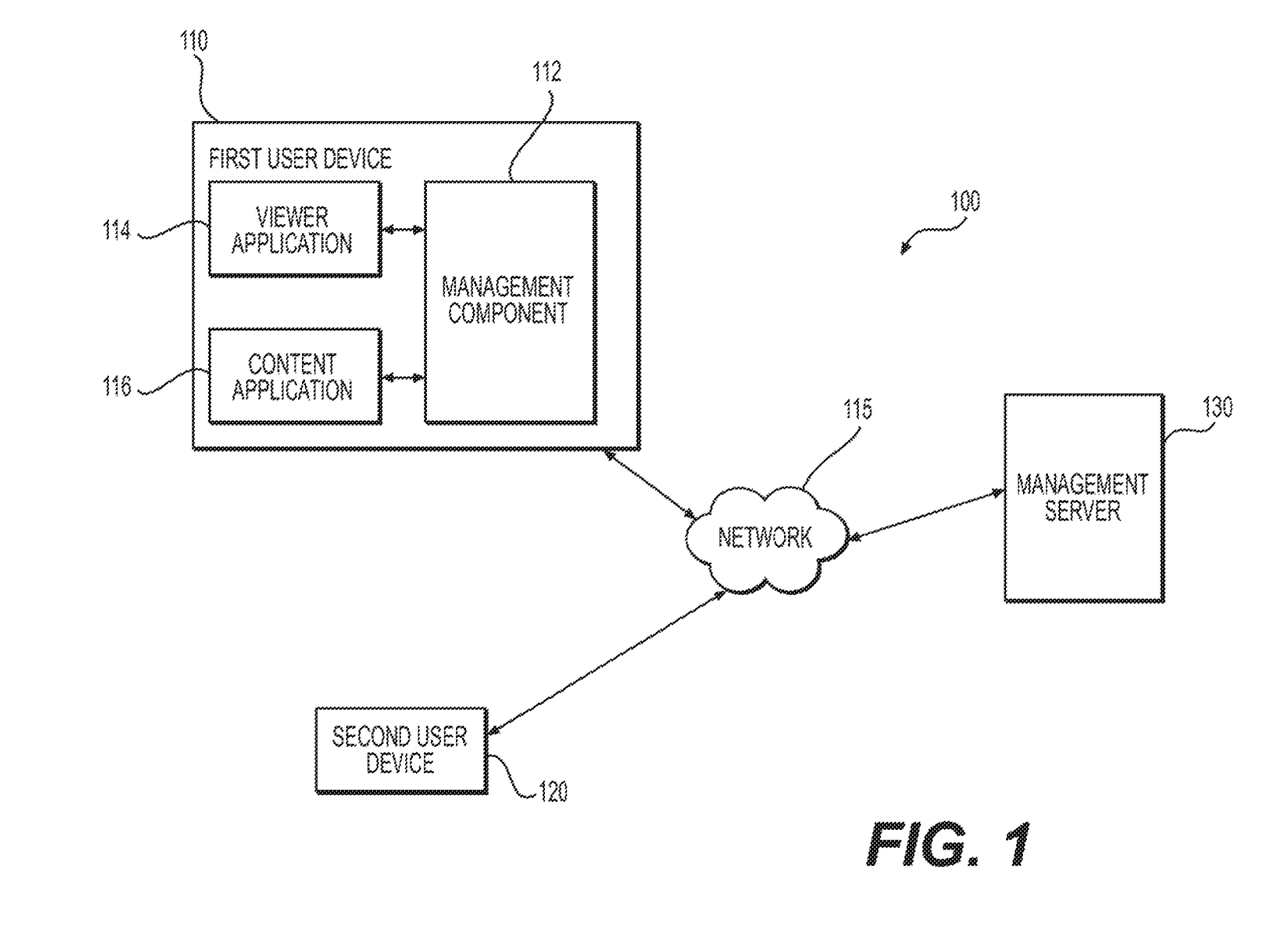
FIG. 1 is an exemplary illustration of system components.

FIG. 1 illustrates an exemplary system 100 for optimized presentation capture. A presenter can use a first user device 110 to record a presentation in association with a slides file. The slides file can be any type of electronic file with pages, such as a PPT document, PDF, word processor document, or spreadsheet. A slide can be a page. The term "presenter" is not meant to limit the examples and can include any user that records a presentation for a slides file.

The first user device 110 and second user device 120 can be any computing device, such as a cell phone, laptop, tablet, personal computer, or workstation. Each can include a non-transitory computer-readable medium containing instructions that are executed by a processor in the user device 110 or 120. Example non-transitory, computer-readable mediums include RAM and ROM, disks, and other memory and storage that is accessible by a USB port, a floppy drive, CD-ROM or DVD-ROM drive, and a flash drive, among others.

The user devices 110 and 120 can execute managed applications, such as a viewer application 114 and content application 116. Using a management component 112 executing on the first user device 110, a management server 130 can interact with and control functionality of the managed applications. Managed applications can cause a user device 110 or 120 to communicate over a network 115 with the management server 130 to securely access files. This can allow a user to use their own user device 110, such as a cell phone, in a work environment where work files can be accessed through use of a managed application by communicating with the management server 130.

The network 115 can be an enterprise network in one example. The network 115 can include the internet, a local area network, or any other suitable communication platform. The first user device 110 and second user device 120 can communicate over the network using one or more modulators, demodulators, multiplexers, demultiplexers, network communication devices, wireless devices, antennas, modems, and any other type of device configured to enable data communication through a communication network.

The management component 112 can include a device-level component. Device-level components can include an application programming interface (API), agent application, hypervisor, or virtualized device. The management component 112 can also include an application-level component. The application-level component can include an API, SDK, app wrapper, or workspace agent app. The device-level management component can include system level privileges. The application-level management component can include privileges in managed applications, which can be developed for operation with the management server 130. Reference to the management component 112 is understood to include either or both of the device-level and app-level components unless otherwise specified.

The management server 130 can interact with the management component 112 with application-level calls to the application or device-level calls to the operating system of the first user device 110. In one example, based on a permissions control for a portion of a presentation or slides file, the management server 130 can turn functionality on and off within the managed applications through calling subroutines in the management component 112. If a permission control specifies it, the management server 130 can turn off functionality at the user device 110, such as printing, emailing, or Internet access. This can allow for added security when viewing or editing particularly sensitive portions of a presentation or slides file.

A viewer application 114 can be a managed application in one example. The viewer application 114 can be installed on the first user device 110 from the management server 130 through communications with the management component 112. Likewise, the management server 130 can utilize the management component 112 to uninstall the viewer application 114. This can be done, for example, if the first user device 110 is lost or if an employee leaves the job. The management server 130 can also use the management component 112 to set permissions within the viewer application 114. This can include restricting which slide files or associated presentation files the user can open. The management server 130 can, for example, restrict access to certain presentations by user group. A user group can be a collection of users stored at the management server 130 that have similar access levels. As an example, a presentation could be restricted to viewing only by an executive group.

In one example, the viewer application 114 executes on the first user device 110 and can open a slides file for viewing or editing by a user. The viewer application 114 can provide a way to display content, including documents, presentations, and video files, having different formats and file types. It can also include an option to record a presentation for a slides file. Alternatively, an option to record a presentation can be provided by a content application 116. In one example, the user can select a slides file within content application 116. The content application can also be a managed application, and request and retrieve files from locations provided by the management server 130. In one example, through use of the management component 112, the content application 116 can communicate with the viewer application 114.

Rather than recording video of the entire presentation, the management component 112 can record action events occurring at the viewer application 114 and media segments. The action events and media segments can correspond to particular slides. When a user changes slides, the viewer application 114 can generate an event signifying a slide change. This can allow the management component 112 to record a separate audio file for each slide, and allow the management component to track events with respect to each slide.

The action events can be recorded in an action information file. The action information file can be an XML file, a JSON-formatted object, or other object type. The action information file can identify the corresponding slides file and version. The action information file can also identify action events and the timing of those action events within each slide. This can allow the viewer application 114 to recreate the action events on playback. The action information file can also identify a recorded audio segment for each slide that is part of the recorded presentation. This can save storage space and network bandwidth compared to capturing video information for the entire presentation.

In one example, the action information file can further identify a media file for non-slide presentation segments. For example, the management component 112 can record the screen of the first user device 110 when the viewer application 114 is minimized. The management component 112 can detect events that indicate the viewer application 114 is no longer in the foreground, and begin recording the screen.

The management server 130 or management component 112 can associate a slides file with an action information file and recorded media segments. In one example, when a second user device 120 requests the slides file, the management server 130 can send the slides file to the second user device 120, along with the action information file. In one example, the management component 112 can send a presentation file that can include the slides file, the action information file, and the media segments. In another example, the management component 12 can send a presentation file that can include the slides file, the action information file, and a first portion of the media segments corresponding to the slides file. In use, if the user navigates to a portion of the slides file for which a corresponding portion of the media segments has not been sent, management component 112 can request the corresponding portion of the media segments from management server 130. In this way, network and bandwidth resources can be conserved and the risk of transmitting unnecessary media segments can be reduced.

The management server 130 can also utilize a file repository, such as a database, in one example. This can allow a management server 130 to track the versions and locations of slides files and action information files. The database can similarly track location and versions of information bundles in an example. This can help ensure that the correct presentation is provided based on the version of the slides file. For example, if a slide is removed from a slides file, a version of the action information file can be modified to remove the action(s) and media segment(s) for that slide.

In another example, the viewer application 114, content application 116, or management component 112 can also execute on a second user device 120. When the second user device 112 attempts to open a presentation, the management component 112 can read the action information file and determine which of the media segments already exist locally on the second user device 120. Based on this determination, the management component 112 can request that management server 130 send the media segments that are not yet present.

The management server 130 can include one or more servers. Each server can include one or more processors that executes instructions stored on a non-transitory computer-readable medium. The management server 130 can similarly include one or more servers and processors.

The devices 110, 120, and 130 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The devices 110, 120, and 130 can also include an I/O module, such as a console with an integrated keyboard and mouse to allow a user to input parameters associated with system 100. An I/O module can also include a display including a graphical user interface (GUI) for outputting information on a screen.

Although an example has been described where the viewer application 114, content application 116, and other applications are managed, the applications can also be unmanaged applications. In addition, the management component 112 and management server 130 need not be provided in all examples. For example, the viewer application 114 executing on the first or second user device 110 or 120 can be developed to include the described management component 112 functionality related to monitoring user activity. In this way, an unmanaged viewer application 114 can record a presentation and create a packed file including the slides, action information, and media file.

Figure 2:
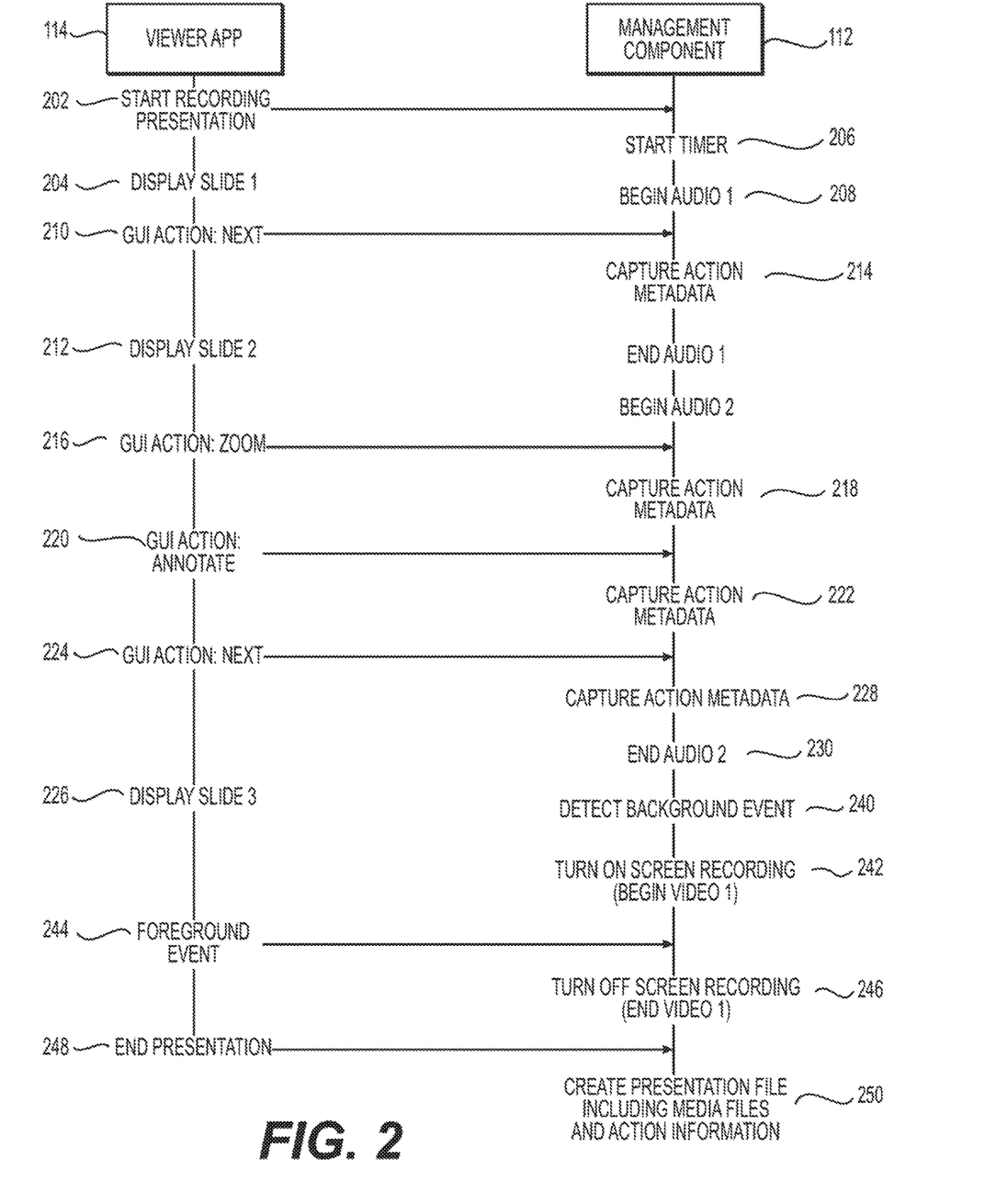
FIG. 2 is an exemplary method executed in a system.

FIG. 2 is an exemplary illustration of a method for recording a presentation on a first user device 110. At stage 202, the viewer application 114 can initiate recording of a presentation. In one example, recording can be initiated by selecting an option within the viewer application. In another example, a recording application or content application 116 can be used to initiate recording, such as using a MICROSOFT POWERPOINT application. The viewer application 114 can monitor operating system calls or otherwise detect launch of the content application and initiation of recording. Upon opening and displaying the first slide at stage 204, the recording can begin.

Initiating recording can cause the management component 112 to begin recording actions and media segments. At stage 206, the management component 112 can start a timer that acts as a reference point to detected action events. To enable re-creation of the actions of a presenter during presentation playback, the management component 112 can record the timing of an event during a slide. In one example, the timer is restarted at the beginning of each slide so that actions within the slide can be recorded relative to slide-specific timing. This can allow the action information to remain synchronized with the slides even when a slide is deleted in the future. The management component 112 can also delete the corresponding action information for that slide.

In synchronization with the timer, at stage 208 the management component 112 can begin recording a first audio segment. The beginning of the first audio segment can substantially align with the display of the first slide.

At stage 210, the viewer application 114 can generate a GUI action when user input is received on the GUI. In this example, the GUI action can request a next slide. The management component 112 can be integrated with the viewer application 114 to receive GUI actions as they occur. In one example, the GUI actions of the viewer application 114 are monitored by the content application 116 for initiating recording. For example, the content application 116 can receive a GUI action indicating that the slides file is in the foreground, and begin recording audio for the displayed slide.

When the management component 112 receives a GUI action, it can capture the action metadata at stage 214. This can include writing action metadata to an action information file, such as illustrated in FIG. 3. As will be discussed in more detail, the action metadata can specify the type of GU action, the timing of the GUI action, and screen coordinates or other information necessary to recreate the GUI action. GUI actions can also include keyboard shortcuts, such as keyboard combinations that navigate between different applications. The timing of the GUI action can be recorded based on the current time of the timer.

Continuing with FIG. 2, at stage 214, the management component 112 can end recording the first audio segment and begin recording a second audio segment because the GUI action in this example indicates a transition to the next slide. The first audio segment can be named and stored. The management component 112 can identify the first audio segment in the action information file as corresponding to the first slide. The management component 112 can finish updating the action metadata for the first slide, and create the beginning of an entry for the next slide in the action information file. In one example, the timer can be reset and restarted at the beginning of recording the second audio segment.

In another example, the management component 112 can create the action information file at the end of the entire presentation rather than in real time. In that example, a single audio file can also be cut into segments when recording ends by the management component 112 based on the start and end times for each slide.

At stage 212, the viewer application 114 can display a second slide. The user can zoom in on the slide, causing the viewer application 114 to generate a corresponding GUI action event specifying the zoom at stage 216. The management component 112 can capture the action metadata at stage 218. For the zoom, this can include a type of zoom, coordinates of the zoom center, amount of zoom, and timing of the zoom.

At stage 220, the user can annotate the second slide, causing the viewer application to generate a GUI action corresponding to the annotation. The management component 112 can capture the action metadata for the GUI action at stage 222. The action metadata associated with the annotation can include an annotation type, coordinates, keystrokes, color, stroke width, and timing information.

At stage 224, the viewer application 114 can generate a GUI action when the user navigates to a third slide. Again, the management component 112 can capture the action metadata at stage 228 and end recording of the second audio segment at stage 230. The management component 112 can update the action information file to associate the second slide with the action metadata and the second audio segment. The action information file can also indicate an end to the action information for the second slide.

The management component 112 can reset the timer and begin recording the third audio segment. This can substantially coincide with the viewer application 114 displaying the third slide at stage 226.

At stage 240, the management component 112 can detect a background event. The background event can indicate that the user is interacting with a managed or unmanaged application other than the viewer application 114. The background event can be a GUI event from another application in one example. It can also be a system-generated event indicating that another window or application is moved or maximized. The background event can also be generated by the viewer application 114 when it is minimized. The background event can cause the management component 112 to end the third audio segment and turn on screen recording at stage 242.

Instead of recording another audio segment, the management component 112 can record a video segment to capture activities occurring outside the viewer application 114. A new audio segment can also be recorded in conjunction with the video segment. Video recording can continue until the viewer application 114 generates a foreground event at stage 244. The foreground event can be generated by the viewer application 114 when it is maximized or when the GUI is selected by the user. Upon detection of the foreground event, the management component can end recording of the video segment and the audio segment, if applicable, at stage 246. The management component 112 can update the action information file to include a non-slide segment that indicates the video segment and audio segment to play.

At stage 248, the viewer application 114 can end the presentation. This can occur when the viewer application 114 is closed or when the user selects an option to stop recording.

At stage 250, the management component can create a presentation file. The presentation file can package an action information file with the slides file in one example. It can also include the media segments in another example. In one example, the presentation file contains a reference to the slides file recognizable by the content application 116, but does not contain the slides file. The content application 116 (using the management component 112) can send the presentation file and media segments to the management server 130 for storage in one example. When the content application 116 opens a presentation file, the content application 116 can read the action information file and retrieve or play the required media segments.

FIG. 3 includes exemplary contents of an action information file. The action information file can be created by the content application 116 or management component 112 in one example. In another example, the viewer application 114 can incorporate similar functionality and can create the action information file.

The action information file can include a presentation tag 302 that can identify information about the presentation. For example, it can include a name or version of the presentation. Although not illustrated in FIG. 3, it can also identify a slides file for use with the presentation. Different versions of a slides file can correspond to different versions of the presentation.

A slides collection tag 304 can indicate the beginning of action information related to slides of the slides file. The slides collection tag 304 can include several slide tags 306 and 320 that are used for organizing action information and timing for each individual slide that is part of the presentation. In one example, the slides need not flow in chronological order. Instead, the action information file can order the slide-specific tags 306 and 320 in the order that they were presented by the user. If the presenter skips ahead to a non-chronological slide, the action information also can skip ahead to that slide. If the presenter returns to a slide that was previously discussed, the action information can include a separate slide-specific tag for the return discussion, along with an additional audio segment. On playback, the viewer application 114 can follow the order of the presentation in the action information file. The viewer application 114 can also allow the user to skip to different portions of the presentation based on the slide tags in the action information file. Playback can then resume at the respective portion of the action information file.

In the example of FIG. 3, a first slide-specific tag 306 includes a slide identifier, such as slide number 1, corresponding to a first slide in the slides file. The first slide-specific tag 306 can include action information for that slide. A first media tag 308 can indicate a first media segment (e.g., "audio101.mp3") to play during the first slide. A timing tag 310 can indicate when the media segment should begin playing.

A first action tag 312 can indicate an action to perform during presentation of the first slide. The first action tag 312 can include a type tag 314 to specify the type of action. In this example, the action type indicates a "Flip Forward" event, which can cause the viewer application 114 to move to another slide in the slides file. Additionally, the first action tag 312 can include a time tag 316 to specify when the action associated with the type tag 314 should occur. The time tag 316 can be relative to the beginning of the slide within which the action occurs in an example. Alternatively, the time tag 316 can be relative to the beginning of the presentation.

The first slide-specific tag 306 can also include an end time tag 318 that represents when the first slide ends. The start time and end time of the first slide can be relative to the overall presentation in one example. In another example, each slide can begin with a new counter, and the end time represents time elapsed from zero.

A second slide-specific tag 320 can identify a second slide (e.g., "102"). During playback, the viewer application 114 can select slide "102" within the slides file. A second media tag 322 can identify a second audio segment (e.g., "audio2.mp3") to play during the second slide. The second start time and end time tags 324 and 340 in this example represent start and end times relative to the rest of the presentation. However, in another example, the start time can be zero and the end time can be relative to zero. That can allow for deletion and addition of slides and corresponding action information without throwing off timing of the rest of the presentation.

Action tag 326 can indicate a first action for the second slide. In this example, action type tag 328 can indicate the action is a pinch-in zoom. The action type tag 328 can also include the percentage of zoom (e.g., "10") and the steps (e.g., "20"), which controls the time it takes to complete the zooming action. The time tag 330 can indicate when the zoom action occurs.

The types of information included to describe an action can vary depending on the action type. For example, action type tag 332 can indicate a circle annotation. It can include coordinates, stroke color, and width. In this example, the circle annotation can occur at a time indicated in time tag 334.

Continuing with the example of FIG. 3, another flip forward action type is specified at action type tag 336. A time tag 338 can indicate when the flip forward occurs. Other action types for moving to another slide can also be possible. Rather than simply flipping forward, a presenter can choose a specific slide that is not in chronological order in one example. End tag 340 can indicate when the second slide ends.

Figure 4:
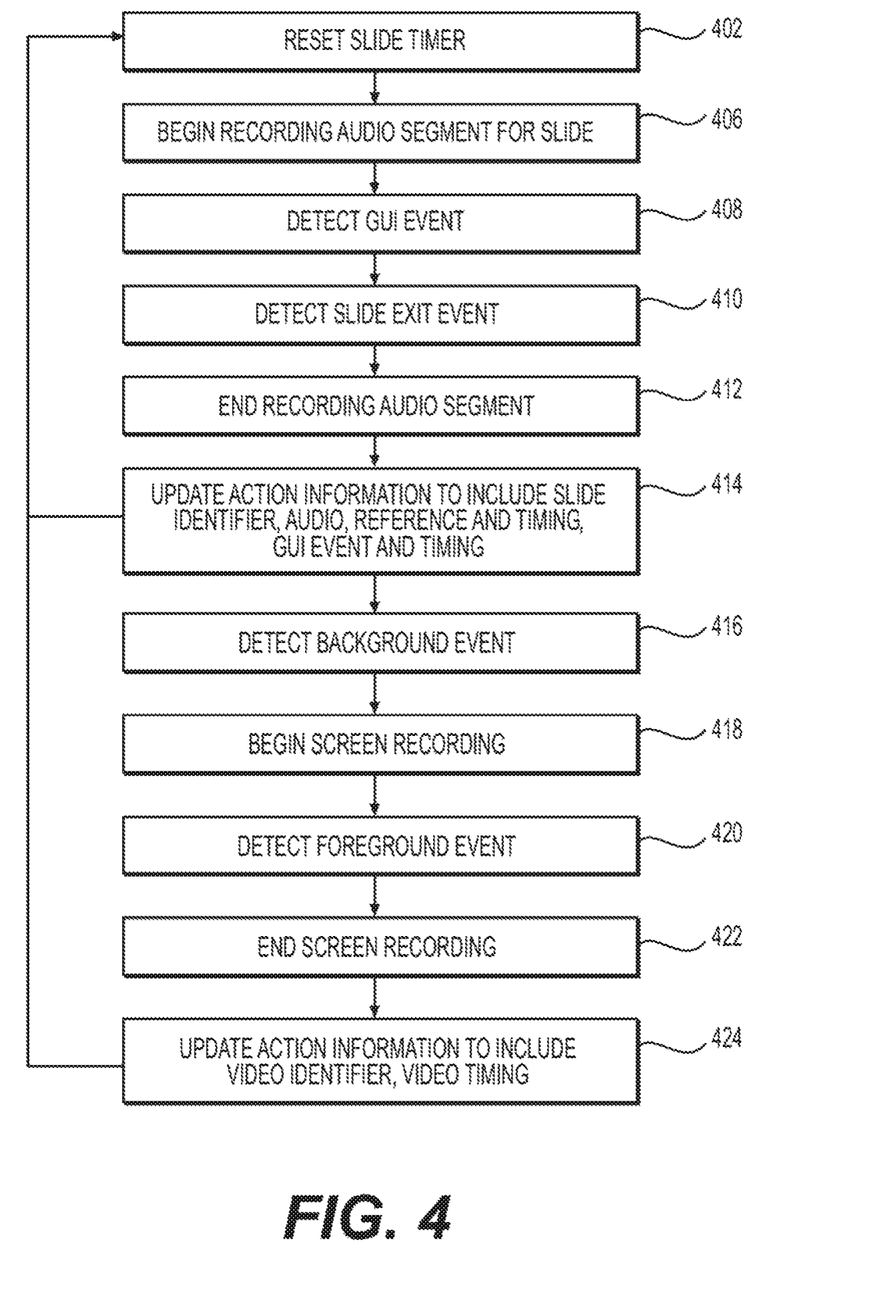
FIGS. 4-7 are exemplary methods for optimized presentation capture.

FIGS. 4-7 are exemplary methods for optimized presentation capture. Turning to FIG. 4, when a slide is opened, at stage 402 the management component 112 can reset the slide timer. At substantially the same time, the management component 112 can begin recording an audio segment for the slide at stage 406. While the slide is being presented, at stage 408 the management component 112 can detect one or more GUI events generated by the viewer application 114. The management component 112 can be configured to record particular GUI events that represent potential annotations or slide changes. The management component 112 can compare GUI events against a whitelist of event types that warrant recording. If the event type is not in the whitelist, it can be ignored for recording purposes. Other events, such as opening an email in response to a notification or preparing an email response, can result in presentation recording being paused, in an example.

Thereafter, at stage 410, the management component 112 can detect a slide exit event. For example, the viewer application 114 can generate an event when the user switches slides. When the slide is exited, the management component 112 can end recording of the audio segment at stage 412. Alternatively, the management component 112 can store a slide end time for reference in an audio file that spans multiple slides.

The management component 112 can then update the action information file at stage 414. The action information file can be updated to include a slide identifier (e.g., a slide number) and reference to the audio segment. The action information can also reference the recorded GUI events, timing information for the GUI events, and other information needed to replicate the GUI events.

For the next slide being displayed, the management component 112 can repeat the stages, beginning at stage 402.

At stage 416, the management component can detect a background event. The background event can be generated by another managed application, indicating that the user is using an application other than the viewer application 114. A background event can also be generated by the viewer application 114 when it is minimized.

At stage 418, the management component 112 can begin screen recording. This stage can be based on detecting particular background events. For example, checking email can be a background event, but the management component 112 can ignore this event for the purposes of screen recording. Instead, it is likely that the presenter decided to check or minimize an email notification that popped up mid presentation.

When a foreground event is detected at stage 420 (e.g., an event from the viewer application 114), screen recording can be stopped at stage 422. The management component 112 can create and store the corresponding new video file. The management component 112 can also update the action information file to reference a media identifier for the video file and timing information for the video file. In one example, this can be inserted in a slide tag. In another example, this can be inserted with a separate media tag that represents a non-slide portion of the presentation.

Figure 5:
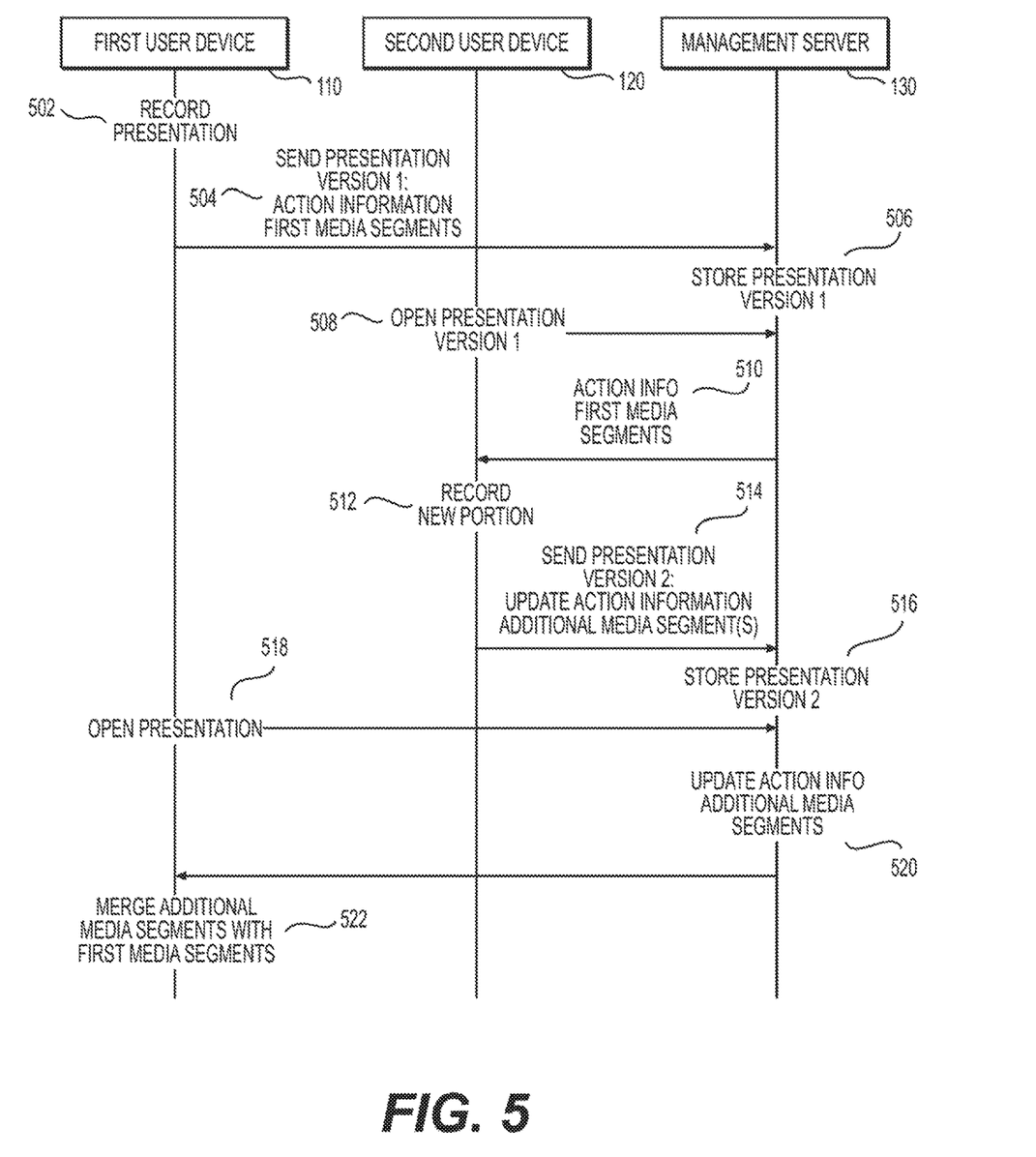

FIG. 5 is an exemplary method for optimized presentation capture between multiple different user devices 110 and 120. In one example, more than one user can contribute to a presentation. Additionally, updated portions of a presentation can be sent to a first user without redundantly sending portions that already exist on a first user device.

At stage 502, a first user device 110 can begin recording a presentation. The presentation recording process can execute as described above. Once recording is complete, at stage 504 the content application 116 executing on the first user device 110 can send an action information file and corresponding first media segments to the management server 130 for storage, along with the slides file if needed.

At stage 506, the management server 130 can store a first version of the presentation. This can include associating the action information file with a first version of the slides file. This can allow the management component 112 or content application 116 to retrieve the corresponding slides file when an action information file is opened. Alternatively, the content application 116 can retrieve an action information file when the slides file is opened. In one example, the management server 130 can store a presentation file that includes an action information file and media segments. The presentation file can include a manifest that is separate from or part of the action information file. The manifest can identify a slides file for use with the presentation file.

At stage 508, a second user device 120 can open the first version of the presentation. In one example, a content application 116 executing on the second user device 120 can request the presentation from the management server 130. At stage 510, the management server can send a manifest file or action information file for the presentation that specifies the slides file and first media segments for use in presentation playback. If the slides file does not yet exist locally on the second user device 120, the content application 116 can request the slides file from the management server 130. If one or more of the first media segments do not exist locally on the second user device 120, the content application 116 can request the one or more media segments not yet on the second user device 130. This can help reduce network traffic. In another example, the management server 130 can send a packaged presentation file that includes the action information, the slides file, and the media segments.

At stage 512, a second user can record a new presentation portion using a viewer application 114 on the second user device 120. The new portion can include discussion of one or more slides in the slides file, and result in the recordation of additional action information and media segments. The second user device 120 can save a second version of the presentation based on the newly recorded portion.

In one example, the second user can delete portions of the first presentation. For example, the second user device 120 can re-record discussion of one or more slides. The second user device 120 can also delete one or more slides from the slides file. The content application 116 can modify the action information file by deleting references to the deleted slides, including the associated action information.

At stage 514, the second version of the presentation can be sent to the management server 130 for storage. This can include sending a new action information file in one example. The new action information file can include newly-recorded actions as well as actions previously recorded on the first user device 110 that were not deleted. Alternatively, only those newly recorded audio portions are sent to the management server 130 to conserve bandwidth, and the management server 130 can create a second version based on the prior recording combined with the new recording. At stage 516, the management server 130 can store the second version of the presentation. In another example, the newly-recorded actions are included in a second action information file. In that example, at stage 516 the management server 130 can store the second action information file in association with the first action information file.

If the slides file has been updated as part of the recording, then the content application 116 can send the second version of the slides file to the management server 130 for storage in association with the second version of the presentation file.

At stage 518, the first user device can open the presentation. In one example, the management server 130 can send an updated manifest or action information file to the first user device 110. The content application 116 can then check for which files indicated in the manifest are not already locally present. This can include the additional media segments recorded at stage 512 and stored at stage 516. The content application 116 can then request the additional media segments, which can be sent by the management server 130. The content application 116 can similarly determine whether it has the correct version of the slides file. If it does not, it can request and receive the file from the management server 130.

At stage 522, the content application 116 on the first user device 110 can merge the additional media segments with the first media segments, resulting in a complete set. The viewer application 114 can then playback the presentation, which can include portions recorded by multiple user devices.

Figure 6:
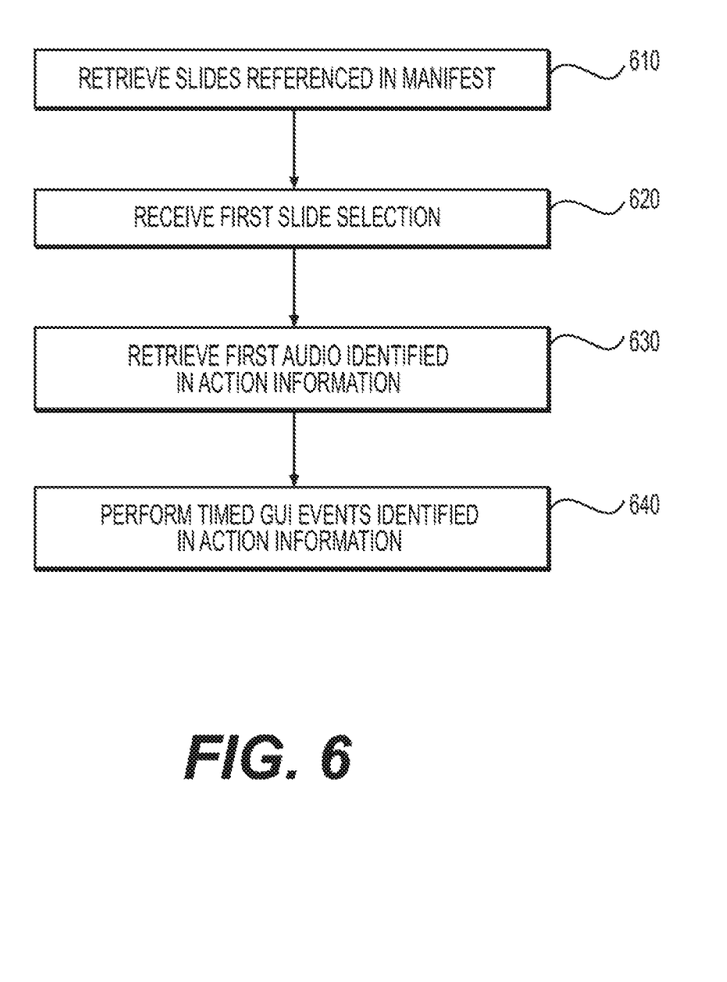

FIG. 6 is an exemplary method for presentation playback on a user device 110. At stage 610, the user device 110 can open a presentation file, which can include a manifest. The manifest can specify at least one slides file that is utilized in the presentation. The content application 116 can retrieve the slides file and open it in the viewer application 114. The presentation can begin playback. Playback can proceed chronologically according to the slides tags in the action information file in one example.

At stage 620, the viewer application 114 can receive a first slide selection for playback. In one example, the user can skip to portions of the presentation based on the viewer application 114 building bookmark options based on the slide tags in the action information file. Slide tags 306 and 320 are previously explained in relation to FIG. 3. Each slide that is part of the recorded presentation can have its own slide tag in the action information file. The slide tag can identify a particular slide in the slides file. Within the slide tag, other tags can exist, such as action information tags, timing tags, and a media segment tag.

The viewer application 114 or other managed application can read the slide tags and identify the corresponding slides as bookmarked options in a navigation pane. The user can select a bookmarked option and skip to the corresponding slide. The action information file can also include descriptive metadata regarding the presentation of one or more slides. The presenter or other user can add descriptive metadata for particular slides after the presentation is recorded in an example. For example, a description tag within the slide tag can include a description for bookmark navigation purposes.

In one example, an action information file can include multiple slide tags for the same slide. This can occur, for example, when a presenter returns to a slide for additional discussion. In this case, the viewer can display multiple bookmark options for the same slide. The viewer application 114 can do this by reading the multiple tags for that slide in the action information file. The viewer application 114 can also provide descriptions for each bookmark for the slide based on reading the description tag within each of the corresponding slide tags.

This can allow the user to quickly see that the slide is discussed multiple times in the presentation. In one example, the user can select between the discussion instances for the same slide based on descriptive metadata. In another example, the user can select the slide for playback and the multiple tags for that slide can be played back in succession.

At stage 630, the user device can retrieve and play a first audio segment identified in the action information file that corresponds to the selected slide. As the audio plays, at stage 640 the viewer application 114 can perform timed GUI events identified in the action information file. GUI events can be identified by action type. They can also include a start time relative to the slide in one example. When a slide is selected for playback, the viewer 114 can reset a timer to ensure that the upcoming GUI event start times occur in synchronization with the recorded audio segment. In another example, the start time is relative to the start of the presentation. In this example, a presentation timer can be set to a slide start time when a user selects a particular slide. This can ensure that the GUI events for that slide occur in synchronization with the recorded audio segment.

In one example, the viewer application 114 can provide a time bar for skipping through discussion on a particular slide. This can allow the user to jump to later points of audio when discussion of a slide is lengthy. In one example, each time the user moves the time slider, the management component 112 can cause audio playback to jump to a corresponding point in the audio segment. Additionally, the management component 112 can compare the selected time to the start times for GUI events for that slide, as specified in the action information file. In conjunction with the viewer application 114, past GUI events with start times prior to the selected time can be performed immediately and chronologically. This can ensure that the slide is in the correct state of zoom, annotation, or other manipulation even when the user skips ahead using the time bar. The slide timer can continue to increment, and GUI events can be recreated in the viewer application 114 as their start times are reached.

In one example, the management component 112 can recreate the GUI events in the viewer application 114. The management component 112 can send messages to the viewer application 114 that emulate the user interaction messages the viewer application 114 interface can receive in real time. As a result, on playback, the user receives the same experience as if a video had been recorded capturing the presenter's screen, but without needing to record and distribute a large video file.

Figure 7:
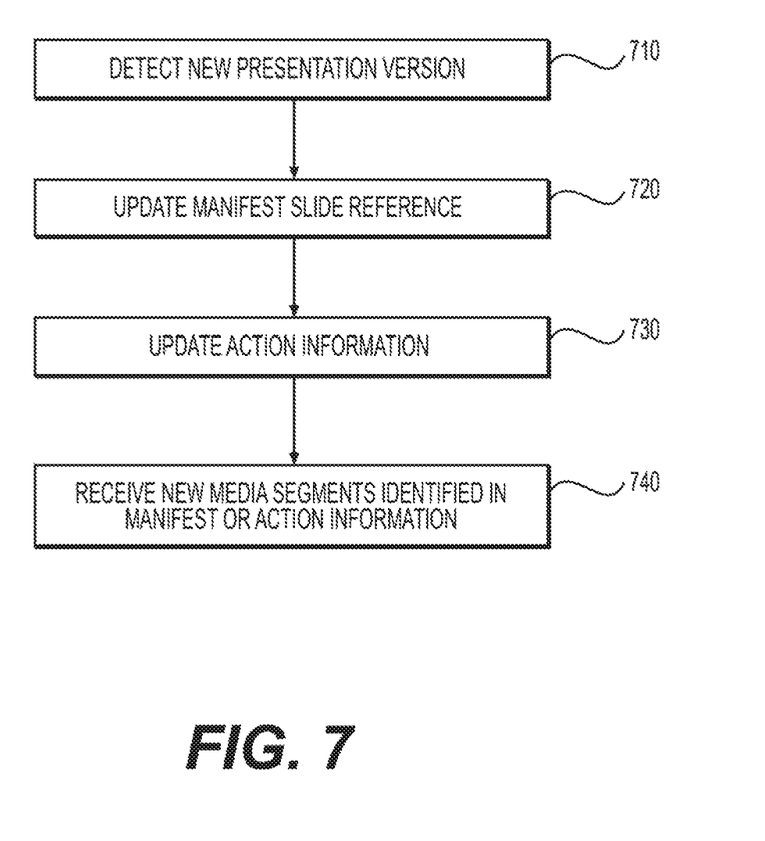

FIG. 7 is an exemplary method for receiving an updated presentation on a user device 110. In one example, a presentation can be updated when a slides file is edited or a user records additional presentation content with respect to the slides file. The management server 130 can track which version of a slides file corresponds with which action information file(s). The action information file can indicate which media segments are needed for the presentation.

At stage 710, the content application 116 can detect that a new presentation version is available. In one example, the management server 130 can send a notification to the content application 116 using the management component 112.

At stage 720, the content application 116 can request and receive an updated manifest from the management server 130. The manifest can be part of an action information file, part of a slides file, or a separate file. It can indicate which action information file corresponds to which slides file.

Based on the updated presentation, at stage 730 the content application 116 can receive updated action information. In one example, this can include receiving a new action information file that replaces a preexisting action information file. The new action information file alternatively can supplement the preexisting action information file in another example.

The content application 116 can read the contents of the new action information file. At stage 740, the content application 116 can request any media segments or slides files not already stored locally on the user device 110. This can save further network bandwidth compared to downloading an entire presentation.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A non-transitory, computer-readable medium containing instructions executed by at least one processor to perform stages for presentation capture, the stages comprising:
    opening a first version of a slides file on a user device for use in presentation recording;
    displaying a first slide of the slides file in a viewer application;
    monitoring action events generated by the viewer application based on user interaction with the viewer application;
    starting recording of a first audio segment for the first slide in the slides file;
    detecting a first action event generated from the viewer application that indicates a second slide will be displayed in the viewer application;
    ending the first audio segment based on detecting the first action event;
    recording a second audio segment for the second slide;
    automatically detecting a graphical user interface event within the second slide during the recording of the second audio segment for the second slide;
    creating a first action information file that associates the first slide with the first action event and first audio segment, and further associates the second slide with the second audio segment, wherein the action information file includes first timing information for the first action event;
    describing the graphical user interface event in the first action information file as a function that, when executed, recreates the graphical user interface event, the first action information file further including associating the graphical user interface event with the second slide and providing second timing information used for recreating the graphical user interface event with the second audio segment in synchronization with when the graphical user interface event occurred while recording the second audio segment; and
    storing the action information file for opening with the first slides file for presentation playback.

2. The non-transitory, computer-readable medium of claim 1, the stages further comprising:
    detecting a background event during recording of the second audio segment;
    in response to detecting the background event, beginning screen recording of the user device, the screen recording being stored in a video file;
    detecting a foreground event generated from the viewer application;
    in response to detecting the foreground event, ending the video file; and
    identifying the video file in the first action information file, including a start time for the video file.

3. The non-transitory, computer-readable medium of claim 1, the stages further comprising:
    opening a second version of the slides file on the user device;
    identifying, from the slides file, a second action information file associated with the slides file;
    downloading the second action information file from a server;
    determining that a media segment referenced in the second action information file is not present on the user device; and
    requesting the media segment from the server.

4. The non-transitory, computer-readable medium of claim 1, wherein storing the action information file includes:
    creating a presentation file that includes the action information file and the first and second audio segments; and
    sending the presentation file to a server.

5. The non-transitory, computer-readable medium of claim 1, the stages further comprising:
    detecting a second action event generated by the viewer application; and
    comparing an event type of the second action event to a list of event types to determine whether to include the second action event in the action information file; and
    based on the comparison, including the second event in the action information file.

6. The non-transitory, computer-readable medium of claim 1, the stages further comprising:
    displaying a plurality of bookmarks for presentation playback based on a plurality of slides identified in the action information file;
    receiving selection of a first bookmark; and
    playing the first audio segment based on the first bookmark being associated with the first slide.

7. The non-transitory, computer-readable medium of claim 6, wherein the action information file identifies a plurality of audio segments for the first slide based on the viewer application returning to the first slide during presentation recording, and wherein the plurality of bookmarks includes bookmarks that correspond to each of the plurality of audio segments for the first slide.

8. A method for presentation capture, comprising:
    opening a first version of a slides file on a user device for use in presentation recording;
    displaying a first slide of the slides file in a viewer application;
    monitoring action events generated by the viewer application based on user interaction with the viewer application;
    starting recording of a first audio segment for the first slide of the slides file;
    detecting a first action event generated from the viewer application that indicates a second slide will be displayed in the viewer application;
    ending the first audio segment based on detecting the first action event;
    recording a second audio segment for the second slide;
    automatically detecting a graphical user interface event within the second slide during the recording of the second audio segment for the second slide;
    creating a first action information file that associates the first slide with the first action event and first audio segment, and further associates the second slide with the second audio segment, wherein the action information file includes first timing information for the first action event;
    describing the graphical user interface event in the first action information file as an object file that, when executed, recreates the graphical user interface event, the first action information file further including associating the graphical user interface event with the second slide and providing second timing information used for recreating the graphical user interface event with the second audio segment in synchronization with when the graphical user interface event occurred while recording the second audio segment; and
    storing the action information file for opening with the first slides file for presentation playback.

9. The method of claim 8, further comprising:
detecting a background event during recording of the second audio segment;
in response to detecting the background event, beginning screen recording of the user device, the screen recording being stored in a video file;
detecting a foreground event generated from the viewer application;
in response to detecting the foreground event, ending the video file; and
identifying the video file in the first action information file, including a start time for the video file.

10. The method of claim 8, further comprising:
opening a second version of the slides file on the user device;
identifying, from the slides file, a second action information file associated with the slides file;
downloading the second action information file from a server;
determining that a media segment referenced in the second action information file is not present on the user device; and
requesting the media segment from the server.

11. The method of claim 8, wherein storing the action information file includes:
creating a presentation file that includes the action information file and the first and second audio segments; and
sending the presentation file to a server.

12. The method of claim 8, further comprising:
detecting a second action event generated by the viewer application; and
comparing an event type of the second action event to a list of event types to determine whether to include the second action event in the action information file; and
based on the comparison, including the second event in the action information file.

13. The method of claim 8, further comprising:
displaying a plurality of bookmarks for presentation playback based on a plurality of slides identified in the action information file; and
receiving selection of a first bookmark and playing the first audio segment based on the first bookmark being associated with the first slide.

14. The method of claim 13, wherein the action information file identifies a plurality of audio segments for the first slide based on the viewer application returning to the first slide during presentation recording, and wherein the plurality of bookmarks includes bookmarks that correspond to each of the plurality of audio segments for the first slide.

15. A system for optimized presentation capture, the system comprising:
a memory;
a non-transitory, computer-readable medium that contains instructions;
a processor that executes the instructions to perform stages including:
opening a first version of a slides file on a user device for use in presentation recording;
displaying a first slide of the slides file in a viewer application;
monitoring action events generated by the viewer application based on user interaction with the viewer application;
starting recording of a first audio segment for the first slide in the slides file;
detecting a first action event generated from the viewer application that indicates a second slide will be displayed in the viewer application;
ending the first audio segment based on detecting the first action event;
recording a second audio segment for the second slide;
automatically detecting a graphical user interface event within the second slide during the recording of the second audio segment for the second slide;
creating a first action information file that associates the first slide with the first action event and first audio segment, and further associates the second slide with the second audio segment, wherein the action information file includes first timing information for the first action event;
describing the graphical user interface event in the first action information file as a function that, when executed, recreates the graphical user interface event, the first action information file further including associating the graphical user interface event with the second slide and providing second timing information used for recreating the graphical user interface event with the second audio segment in synchronization with when the graphical user interface event occurred while recording the second audio segment; and
storing the action information file for opening with the first slides file for presentation playback.

16. The system of claim 15, the stages further comprising:
detecting a background event during recording of the second audio segment;
in response to detecting the background event, beginning screen recording of the user device, the screen recording being stored in a video file;
detecting a foreground event generated from the viewer application;
in response to detecting the foreground event, ending the video file; and
identifying the video file in the first action information file, including a start time for the video file.

17. The system of claim 15, the stages further comprising:
opening a second version of the slides file on the user device;
identifying, from the slides file, a second action information file associated with the slides file;
downloading the second action information file from a server;
determining that a media segment referenced in the second action information file is not present on the user device; and
requesting the media segment from the server.

18. The system of claim 15, wherein storing the action information file includes:
creating a presentation file that includes the action information file and the first and second audio segments; and
sending the presentation file to a server.

* * * * *